No. 717,827. PATENTED JAN. 6, 1903.
W. T. G. ELLIS.
SPRING TIRE FOR VEHICLE WHEELS.
APPLICATION FILED DEC. 5, 1901.
NO MODEL.

Witnesses
Inventor
William T. G. Ellis,
By Knight Bros.
Attys.

THE NORRIS PETERS CO., PHOTO-LITHO., WASHINGTON, D. C.

UNITED STATES PATENT OFFICE.

WILLIAM THOMSON GOUDE ELLIS, OF GLASGOW, SCOTLAND, ASSIGNOR TO THOMAS ALEXANDER JEBB, OF GLASGOW, SCOTLAND.

SPRING-TIRE FOR VEHICLE-WHEELS.

SPECIFICATION forming part of Letters Patent No. 717,827, dated January 6, 1903.

Application filed December 5, 1901. Serial No. 84,800. (No model.)

*To all whom it may concern:*

Be it known that I, WILLIAM THOMSON GOUDE ELLIS, traveler, a subject of the King of the United Kingdom of Great Britain and Ireland, and a resident of 3 Victoria Quadrant, Cathcart, Glasgow, in the county of Glasgow, Scotland, have invented a Spring or Non-Pneumatic Tire for the Wheels of Cycles, Motors, and other Vehicles, of which the following is a specification.

This invention relates to a spring or nonpneumatic tire for the wheels of cycles, motors, and other vehicles.

In accordance with my invention I dispense with the usual air-tube, and in lieu thereof I employ a series of arched wires or springs, of any suitable metal or material, arranged across the rim of the wheel. The said springs are constructed of a length of, say, well-tempered steel wire, which is bent in a zigzag form and is inserted within and around the trough-shaped rim of the wheel.

Figure 1:
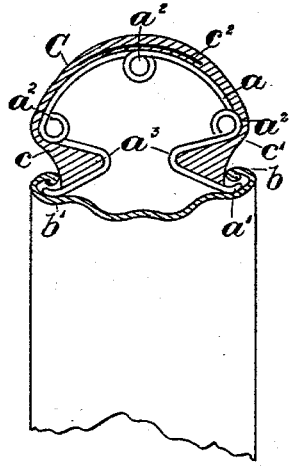
Figure 4:
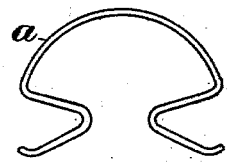
Figure 3:
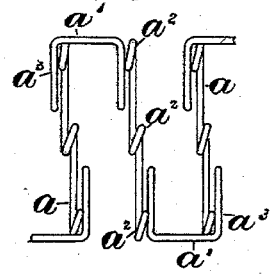
Figure 2:
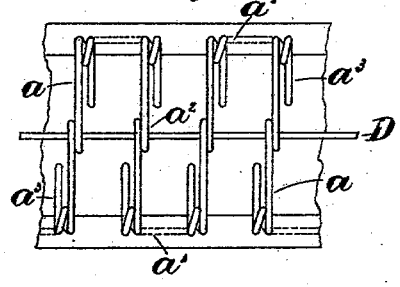

Figure 1 is a cross-section through the rim of the wheel, showing the arched wires and cover stretched thereover. Fig. 2 is a plan of a portion of the wheel looking down on the top of the arched wires with the cover removed. Fig. 3 is a plan of the under side of a portion of the arched wires removed from the rim. Fig. 4 is a modification in the construction of the arched wires hereinafter referred to.

As shown more particularly in Figs. 2 and 3, the wire is endless, or it may be in lengths, and each of the zigzag or like formations of the wire across the width of the rim may be half an inch or so apart. The continuation of the wire from the one wire arch $a$ to the next goes along the circumferential rim or edge of the wheel, as shown at $a'$, the said wire protruding under and along that edge, being the means whereby the wire is retained within the rim of the wheel after the wires have been sprung thereinto.

Each of the wire arches may be constructed with, say, three sets of spiral twists $a^2$ $a^2$ $a^2$, Fig. 1, so as to give elasticity to the arched wires, or I may employ the equivalent, such as indentations or zigzags.

The lower part of the arched wire is formed, Fig. 1, with deep bends or indentations $a^3$, pointing inward toward the center of the trough of the rim, as shown in Fig. 1, the arrangement being such that the turned-in edge $b$ of the rim of the wheel projects within the said bends. In this view is shown a cover C—say of canvas rubber—stretched over the arched wires. The edge of the cover is constructed with a thickened portion $c$, which lies within the bends or indentations $a^3$ of the wires in such a manner that the said thickened edge is firmly wedged within the said indentations $a^3$ and between the back of the same and the edge $b$ of the rim of the wheel; also so that when the wheel is running the weight on the arched wires causes the said thickened edge of the cover to be gripped between the two wires of the indentations $a^3$, so as to act as a buffer and to assist in giving resiliency to the wheel. When excessive pressure is put upon the wheel or when the cushioning effect on the thickened rubber portion is exhausted, the part $c'$ of the body of the cover intervenes between the side spirals $a^2$ of the arched wires and the top of the rim $b$ of the wheel to act as a further cushion and to prevent the wires striking each other.

The cover may be of rubber, canvas-lined, the canvas being in contact with the wires, with the rubber outside, or the cover may be of other material, with or without a canvas or other lining. There may be inserted a thin steel $c^2$, or it may be whalebone, or I may employ any other metal or material as a hard but light substance for the wires to press upon, or the whole inner surface of the cover of any material or materials may be lined with thin metal, such as aluminium or steel or with any other metal, or lined with other suitable material, such as whalebone.

When the wheel is running, the effect of the rider's weight is to jam the ends $a'$, Fig. 1, of the arched wires firmly within the recess of the turned-up edge $b$ of the rim of the wheel, so that the wires are thereby firmly secured within the trough of the wheel, and to effect this I preferably make the section of the rim as illustrated in Fig. 1—that is to say, with a slightly-channeled portion $b'$, into which the ends $a'$ of the wires are sprung, and thereby retained in their proper position within the rim of the wheel.

It will be seen that a maximum of resiliency is obtained by reason of the various features of the manufacture of the springs—that is to say, that there are the wire arches and with their deep side indentations $a^3$, which act as a resilient spring; but in addition to that I may provide the three or other spirals $a^2$ $a^2$ $a^2$, which still further enhances the resiliency of the wires. The said indentations $a^3$ may be varied in depth as found desirable. Also the spirals may be of double, treble, or any number of twists. Further, there is the combination with this formation of wire of the rubber covering, the thickened edge of which is gripped within the indented sides $a^3$ of the wires to act as a cushion to still further enhance the resiliency of the wires.

The arched wires may be modified in various ways. For example, as shown in Fig. 4 the arched wires may be made without any spirals, or instead of the three spirals shown in Figs. 1, 2, and 3 each arched wire may have, say, five spirals—that is to say, the same spirals as at $a^2$ $a^2$ $a^2$, Fig. 1, but with, say, two other opposite spirals below at, say, the inner bend of the indentation $a^3$, Fig. 1—or any other number or arrangement of coils may be employed and made of any desired twists.

I may pass a wire, such as D, Fig. 2, or other binder through each or any of the spiral twists of the wire or in any other way around the wheel, so as to form binding-rings around the wheel to bring the strain on the arches collectively. In order to keep the arched wires equidistant, I may employ spiral coils or their equivalent between the arched wires, not only on the center binding-wire, but also, if desired, on the side binding-wires, or the cover may be provided, formed, or molded with ribs at the inside thereof to keep the arched wires from shifting out of their proper position.

I am aware that a non-pneumatic tire has been made with a series of coiled springs enveloped in casings of sheet-rubber and other material with an outer cover of elastic rubber and an intervening canvas strip, the edges of which are held between the folds of the springs to assist in keeping them in place.

My invention differs essentially from the above in that I employ in combination with coiled wire springs an outer cover of elastic rubber formed with margins or edges of increased thickness, which specially-thickened edges are inserted in lateral indentations in the wire springs, so as to exert effective resilience when the springs are compressed and materially reinforce and strengthen the same.

I do not limit myself to the precise section of the thickened edge of the cover—that is to say, it may be molded in other convenient shape or section or the required thickened edge may be produced in any other way, such as by the insertion of a thickening material.

I claim—

1. The zigzag wire springs $a$ formed with deep lateral indentations $a^3$ and projecting edges $a'$ for attachment to the rim of the wheel; in combination with a suitable cover C in which said springs are inclosed and a wheel-rim formed with peripheral flanges $b$ and channels $b'$ into which the projecting edges $a'$ of the springs are sprung, substantially as described.

2. The combination of the zigzag wire springs $a$ formed with deep lateral indentations $a^3$ and projecting edges $a'$ for attachment to the rim of the wheel; the wheel-rim formed with inturned peripheral flanges $b$ and channels $b'$ into which the projecting edges $a'$ of the springs $a$ are sprung; and the cover C inclosing the springs $a$, having thickened edge portions $c$ of elastic rubber fitting within the indentations $a^3$ of the springs and confined between the peripheral flanges $b$ of the wheel, as and for the purposes described.

WILLIAM THOMSON GOUDE ELLIS.

Witnesses:
JAMES YATE JOHNSON,
JAMES LAURENCE WELLS.